United States Patent [19]

Calmettes et al.

[11] Patent Number: 5,314,210
[45] Date of Patent: May 24, 1994

[54] DEVICE FOR CONNECTING A FLEXIBLE PIPE TO A RIGID TUBULAR JOINING PIECE

[75] Inventors: Lionel Calmettes, Romorantin-Lanthenay; Pascal Detable, Villedieu, both of France

[73] Assignee: Etablissements Caillau, Issy-Les-Moulineaux, France

[21] Appl. No.: 910,294

[22] PCT Filed: Feb. 1, 1991

[86] PCT No.: PCT/FR91/00065

§ 371 Date: Jul. 15, 1992

§ 102(e) Date: Jul. 15, 1992

[87] PCT Pub. No.: WO91/11649

PCT Pub. Date: Aug. 8, 1991

[30] Foreign Application Priority Data

Feb. 2, 1990 [FR] France ............... 90 01259

[51] Int. Cl.$^5$ ............................................ F16L 35/00
[52] U.S. Cl. ........................................ 285/93; 285/256; 285/345; 285/379
[58] Field of Search ............... 285/256, 345, 379, 93

[56] References Cited

U.S. PATENT DOCUMENTS

| | | | |
|---|---|---|---|
| 4,703,957 | 11/1987 | Blenkush | 285/93 X |
| 4,969,667 | 11/1990 | Sauer | 285/256 |
| 4,969,668 | 11/1990 | Sauer | 285/256 |
| 5,040,829 | 8/1991 | Sauer | 285/256 |
| 5,082,315 | 1/1992 | Sauer | 285/256 |
| 5,094,493 | 3/1992 | Sauer | 285/256 |

Primary Examiner—Dave W. Arola
Attorney, Agent, or Firm—Marshall & Melhorn

[57] ABSTRACT

Device for connection between a flexible pipe 1 and a rigid tubular joining piece 2 intended to be fitted inside the flexible pipe. Two coaxial, rigid, tubular elements 3, 4 are disposed respectively inside and outside the end of the flexible pipe and embrace this end. The inner tubular element 3 and the outer tubular element 4 each present, in contact with the flexible pipe, two cylindrical portions of different diameters, 3a,4a-3b,4b, the one of larger diameter being located towards the free end of the flexible pipe. The portion of larger diameter 3b of the inner tubular element thus constitutes, on its inner face, a housing 5 for the O-ring, said housing being closed by an annular wall 8 fixed to the outer tubular element 4.

8 Claims, 2 Drawing Sheets

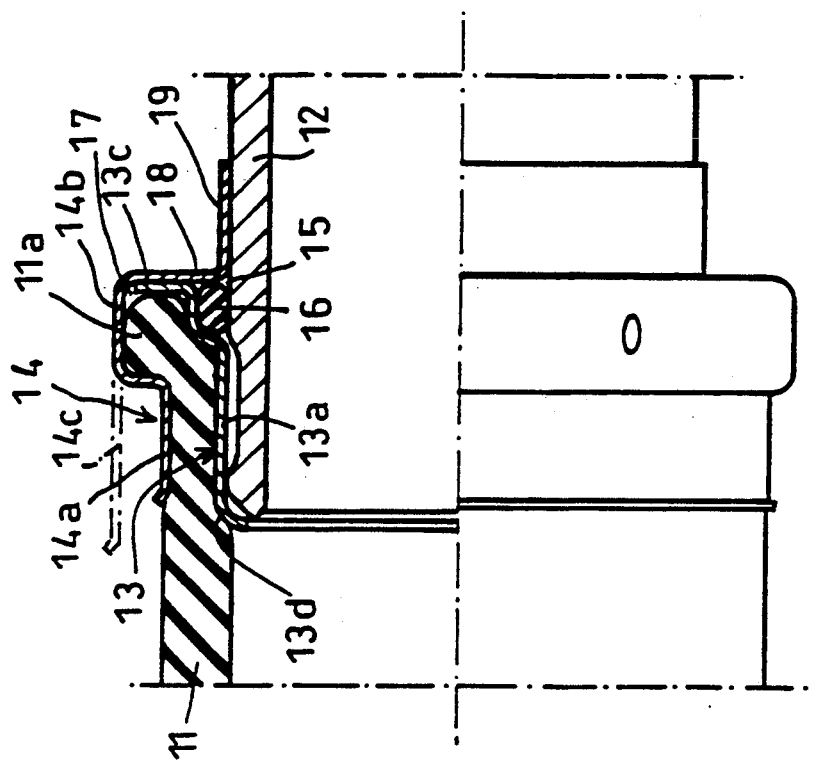
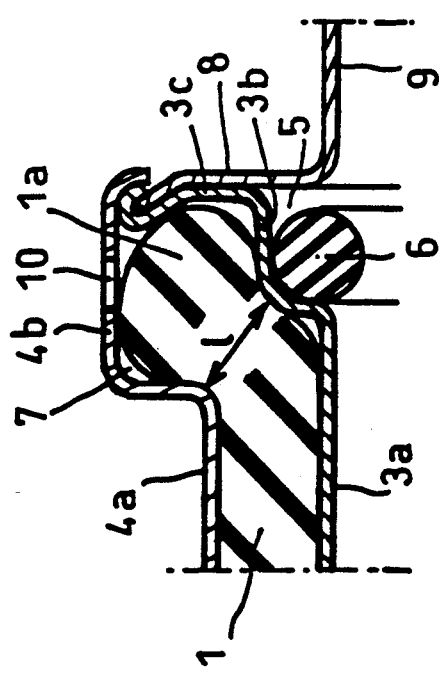

DEVICE FOR CONNECTING A FLEXIBLE PIPE TO A RIGID TUBULAR JOINING PIECE

Patents FR-A-1 558 355, DE-A-3 815 168 and DE-A-3 914 645 in particular already disclose a device for connecting a flexible pipe on a rigid tubular joining piece, such a device essentially comprising a rigid tubular assembly fixed in tight manner to the end of the flexible pipe, this assembly being provided with sealing means and with assembly and/or locking means cooperating with elements complementary of the rigid joining piece. More precisely, the tubular assembly fixed to the end of the flexible pipe comprises two coaxial rigid tubular elements disposed respectively inside and outside the end of the flexible pipe, adapted to receive the rigid joining piece. In the more particular case of the German Patents mentioned above, these two tubular elements embrace the free end of the flexible pipe in the form of a bead and simultaneously ensure seal and mechanical strength of the assembly, thanks to radial deformations revealing cylindrical portions of different diameters on each of the inner and outer tubular elements. Furthermore, in order to ensure seal of the connection, an O-ring, capable of coming into contact with the outer piece of the rigid joining piece, is disposed in a housing made on the inner surface of the inner tubular element by its portion of larger diameter. The housing is closed, towards the outside in the axial direction, by a radial annular wall, connected to the outer tubular element, whose inner diameter is substantially equal to the inner diameter of the inner tubular element. At least one of said tubular elements comprises assembly and/or locking means cooperating with complementary means provided in register on the rigid joining piece.

The known connecting devices of the type in question present several drawbacks despite their efficiency.

On the one hand, they comprise relatively heavy and/or voluminous members, sometimes difficult to place in position, which in practice prevent their being used for certain applications, particularly if the assembly must be effected by means of machines such as robots, which can generally effect only translations.

On the other hand, and in consequence of these first drawbacks, the known devices are relatively expensive, both due to the nature or structure of the parts which constitute them and to the time necessary for positioning them.

Finally, particularly in the case of the two German Patents mentioned above, the fastening of the rigid tubular assembly on the end of the flexible pipe requires a considerable deformation of the latter, in particular in order to reveal, inside said assembly, a housing for the 0-ring with the joining piece. Such deformations may bring about creeping of the flexible pipe, highly detrimental to the correct holding of the device.

It may be recalled here that, in the particular case of the hydraulic cooling circuits for vehicle motors, the flexible pipes must be equipped, before being connected together, with the tubular assembly intended to be fitted and fixed on the rigid joining piece; this latter itself generally forms a part of an apparatus, such as a heat exchanger previously placed in position. The operation of assembly of the pipe and of its tubular end assembly as well as the operation of connection proper must be as simple as possible and necessitate only a number of parts as small as possible. In particular, the addition or manipulation of parts in the final phase of connection must be avoided.

The numerous technical and commercial requirements which have just been recalled have led Applicants to seek a device for connecting a flexible pipe on a rigid joining piece, of the type described in the Patents cited above, which eliminates the drawbacks thereof whilst presenting various advantages.

According to the invention, the cylindrical portions of larger diameter of the inner tubular element and of the outer tubular element (constituting what has been called "the tubular assembly" fixed to the end of the flexible pipe), preferably made of thin metal sheet, are located, in the radial direction, opposite the terminal bead of the flexible pipe, whilst the radial annular wall, closing the housing of the O-ring, is a piece distinct from the inner tubular element.

Thanks to these arrangements, the tight fixation of "the tubular assembly" on the flexible pipe does not require a considerable radial compression of the latter, whilst allowing easy production of the housing of the O-ring; these operations are effected at the manufacturer's, at the same time as the production of the locking means intended to cooperate with those provided on the rigid joining piece. These latter will preferably be of the type described in Applicants' European Patent Application entitled: "Device for locking two coaxial tubes" and published on Aug. 28, 1991 under No. 443.895.

In this way, connection of the flexible pipe on a rigid joining piece necessitates no added part nor even any manipulation other than the simple fit of the end of the flexible pipe on the rigid joining piece.

The invention will be more readily understood and various secondary characteristics as well as its advantages will appear in the course of the following description of some embodiments with reference to the accompanying drawings, in which:

FIG. 3 is a view on a larger scale of a detail of assembly of the tubular end assembly of the flexible pipe.

FIG. 4 is a view similar to FIG. 2 in the case of a variant embodiment.

Figure 2:
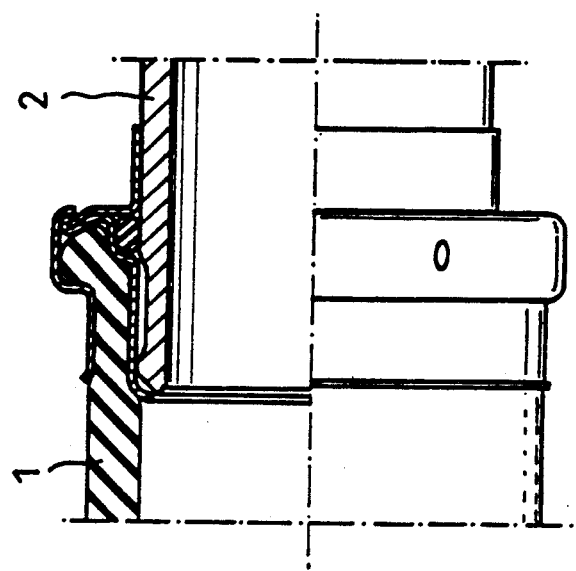
FIG. 2 is a similar view of the device after assembly thereof.
Figure 1B:
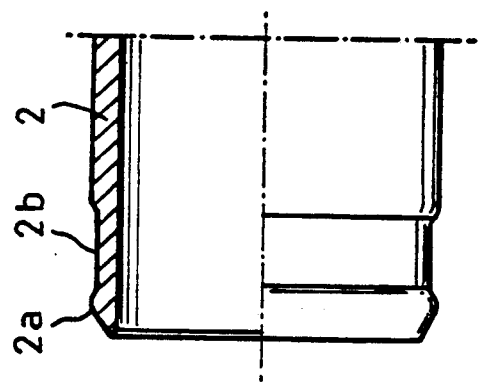
FIG. 1a and FIG. 1b are outside views, partially in axial section, of a connecting device according to the invention before assembly thereof.
Figure 1A:
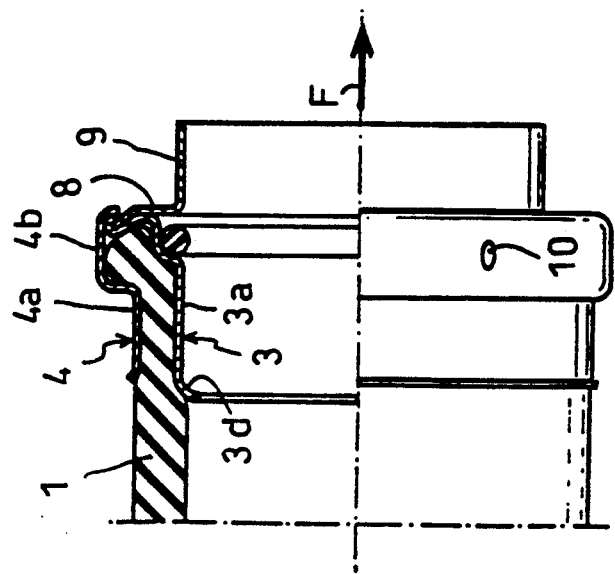

If reference is firstly made to FIGS. 1 to 3, a device for connecting a flexible pipe 1, for example of rubber, and a rigid joining piece 2, for example of plastics material, is shown. In the following, it will be assumed that the rigid joining piece is fixed on an apparatus which cannot be displaced at the moment of connection.

Joining piece 2 is constituted by a cylindrical part whose free end presents, in known manner, a bead 2a generally followed by a groove 2b of small depth.

The free end of the pipe 1, intended to be fitted on the joining piece 2, is equipped with a "tubular assembly" essentially constituted by two rigid tubular elements 3 and 4, coaxial and disposed respectively inside and outside the pipe. These two tubular elements ensure, under conditions which will be specified, a suitable mechanical tightening of the end of the pipe, which is thus rigidified as well as a sufficient seal between the inner wall of the pipe and the inner element 3.

Each of the two elements 3 and 4 comprises two cylindrical portions 3a, 3b and 4a, 4b, of different diameters, the portions of larger diameter 3b, 4b being located opposite the free end 1a of the pipe. On the contrary, the portions 3a, 4a of smaller diameter ensure radial tightening of the wall of the pipe and their diameters are respectively at least equal to the inner diameter of the pipe and at the most equal to the outer diameter thereof. In addition, the inner diameter of portion 3a is substantially equal to the outer diameter of the bead 2a of the joining piece.

Portion 3b of larger diameter of the inner tubular element 3 constitutes, towards the inside, a housing 5 for an O-ring 6 of appropriate flexible material, for example elastomer, whose inner diameter in the free state is somewhat less than the outer diameter of the joining piece 2. This portion 3b is preferably connected to a radial wall 3c which extends substantially as far as the inner face of the portion of large diameter 4b of the tubular element 4.

On the other hand, the two portions 3b, 4b of larger diameter of the two inner and outer tubular elements define therebetween with the radial wall 3c, a cavity 7, open towards the left in the Figures, imprisoning the free end 1a of the pipe which then forms a bead whose diameter is somewhat larger than that of the pipe. In that respect, it will be noted here that the minimum width 1 of the passage between the cavity 7 and the annular zone defined by the two cylindrical portions 3a and 4a is slightly less than the thickness of this annular zone.

The housing 5 of the O-ring 6 is closed, towards the outside in the axial direction, by an annular wall 8 whose inner diameter is substantially equal to that of the cylindrical portion 3a. As clearly shown in the Figures, the radial wall 8 is preferably connected, in the direction opposite the pipe, to a bush 9 whose inner diameter is, it too, substantially equal to the outer diameter of the joining piece 2.

Finally, it will be noted that, at its inner end, the inner tubular element 3 presents a shoulder 3d directed towards the inside, capable of constituting an axial stop for the joining piece under conditions which will be specified hereinafter. Moreover, at least one hole 10 is provided in the portion 4b of the outer tubular element 4 and opens out in cavity 7.

The tubular end assembly of the pipe, which has just been generally described, may be made of any appropriate material. However, as clearly shown in the Figures, in particular in FIG. 3, it is advantageous to make it in thin metal sheet, which facilitates manufacture and assembly thereof and limits the cost thereof. Moreover, as will be readily realized, the resultant dimensions of the connection remain very small and correspond only to the outer diameter of portion 4b.

After having fitted pipe 1 in the outer tabular element 4 until its terminal face is located in the portion 4b of large diameter, the inner tubular element 3 is fitted under known conditions, similar to those described for example in French Patent A-1 434 683. As clearly shown in FIG. 3, the radial wall 8 fast with its bush 9 has preferably been previously crimped on the outer periphery of the radial wall 3c of the inner tubular element 3.

The terminal bead 1a of the pipe is then imprisoned in the cavity 7 and the tubular end assembly of the pipe is terminated by the crimping of the free edge of the portion 4b on the outer periphery of the radial wall 8. Hole 10 makes it possible to verify visually the presence of bead 1a in cavity 7.

Finally, complementary means (not shown) are provided on the one hand on the joining piece, on the other hand on the tubular assembly, preferably on the bush 9, in order to ensure mechanical connection of the two members, in the axial direction. These means will preferably be of the type described and shown in the Patent Application filed by Applicants this day and entitled: "Device for locking two coaxial tubes".

The man skilled in the art will, of course, already have understood that connection of the pipe on the joining piece is effected simply by displacing the tubular assembly 3, 4 and its pipe 1 towards the joining piece 2 in the direction of arrow F of FIG. 1.

In the course of this operation, bush 9 facilitates guiding and the displacement in the direction of arrow F continues until the end of the bead 2a comes into abutment on the shoulder 3d of the inner tubular element 3. After the O-ring 6 has passed over the bead 2a, the effort necessary for displacement in the direction of arrow F reduces abruptly due to the presence of the groove 2b. Whatever the means, manual or motorized, used for displacing the pipe, it then acquires an inertia which facilitates positioning up to contact of the stop 3d on the bead 2a and consequently the cooperation, generally automatic, of the means (not shown) for locking the tubular assembly and the joining piece. In any case, tightness of the connection is ensured by the contact of O-ring 6 and the outer surface of joining piece 2, beyond groove 2b (FIG. 2).

Such a connecting device is particularly adapted to robotized assembly; however, it may very easily be placed in position manually for example if it is question of a replacement piece. Much more, in this latter eventuality, the well known shape of the joining piece 2 and more particularly the presence of the bead 2a and groove 2b make it possible directly to fit a flexible pipe on the joining piece and to maintain it by a known clamp.

If reference is now made to FIG. 4, a variant embodiment is seen in which the elements already described bear the same references increased by 10. The tubular end assembly of pipe 11, which, in its preceding embodiment comprised three pieces 3, 4 and 8, comprises no more than two designated by references 13 and 14.

In fact, the radial annular wall 18 closing the housing 15 of the O-ring 16 constitutes one piece with the outer tubular element 14 and is joined directly to the portion of large diameter 14b.

Assembly of the tubular assembly 13-14 is slightly different from that which has been described hereinabove.

The inner tubular element 13, suitably formed with its shoulder 13d and its lateral wall 13c, is firstly fitted in the free end of the pipe 11.

The tubular element 14, previously shaped to reveal the radial wall 18 and possibly the bush 19, comprises a cylindrical extension 14c (shown in interrupted lines) of what will become its portion of larger diameter 14b.

The cylindrical bush 14b-14c is fitted on the right-hand end of the pipe 11 and covers the bead 11a until the radial wall 18 is in abutment on the inner tubular element 13.

A contraction operation then reduces the diameter of portion 14c of the bush and reveals portion 14a of the outer tubular element at the same time as bead 11a of the pipe is imprisoned in cavity 17 under the conditions quite similar to those which were specified hereinabove.

The operation of connection of pipe 11 on joining piece 12 is, of course, effected in the same manner as that described regarding the first embodiment and presents the same advantages.

We claim:

1. A connection device between a flexible pipe having an outwardly extending radial bead at the free end thereof and a rigid tubular joining piece fitted inside the flexible pipe, the improvement comprising:

a rigid inner tubular element, said inner tubular element formed with first and second cylindrical portions of different diameters;

a rigid outer tubular element in spaced coaxial relation with said inner tubular element, said outer tubular element formed with first and second cylindrical portions of different diameters and spaced from and cooperating with respective first and second cylindrical portions of said inner tubular element, said inner and outer tubular elements embracing the radial bead of the flexible pipe in the radial space defined by the outer surface of the second cylindrical portion of said inner tubular element and the inner surface of the second cylindrical portion of said outer tubular element; and said inner and outer tubular elements embracing the flexible pipe in the radial space defined by the outer surface of the first cylindrical element of said inner tubular element and the inner surface of the first cylindrical element of said outer tubular element;

an annular radial wall secured to said outer tubular element and depending radially inwardly therefrom and terminating at an annular plane substantially aligned with the first cylindrical portion of said inner tubular element; and an O-ring adapted to contact the outer surface of the rigid tubular joining piece and disposed in a housing defined by the inner surface of the second cylindrical portion of said inner tubular element and said annular radial wall.

2. A connection device according to claim 1, wherein said annular radial wall defining the housing of the O-ring is integral with said outer tubular element.

3. A connection device according to claim 1, wherein said annular radial wall is secured by crimping means at the free end of said outer tubular element.

4. A connection device according to claim 1 wherein said radial wall is an extension of said outer tubular element.

5. A connection device according to claim 1 wherein said outer tubular element is provide with an inspection hole in the area of the free end of the flexible pipe.

6. A connection device according to claim 1 wherein at least one of said tubular elements is formed of thin metal sheet material.

7. A connection device according to claim 1 wherein said radial wall is formed of thin metal sheet material.

8. A connection device according to claim 1 wherein said inner tubular element includes an axial stop for the rigid tubular joining piece.

* * * * *